Aug. 26, 1958     G. E. McMANN     2,848,790
COOLANT DIRECTING CUTTING TOOL ASSEMBLY
Filed Nov. 12, 1953
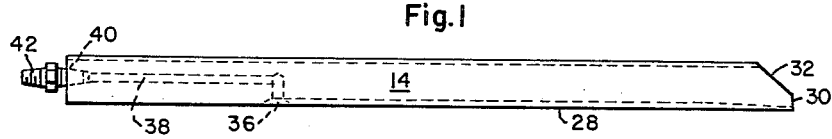
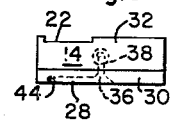
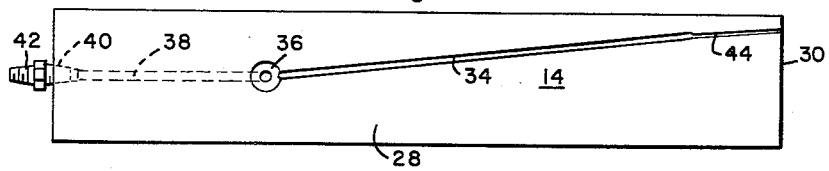
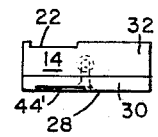
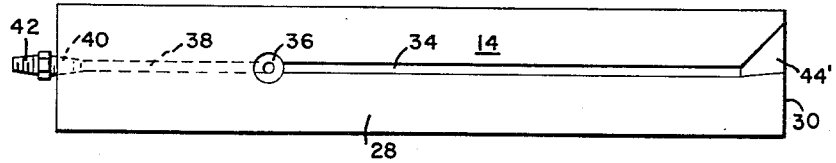
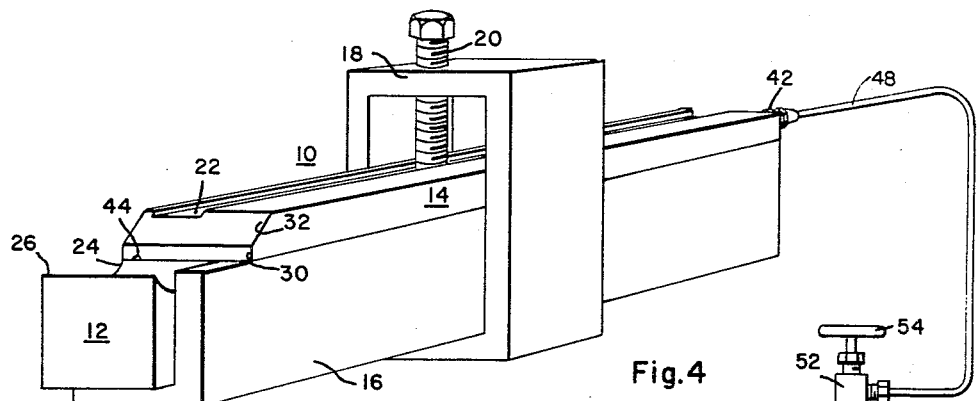
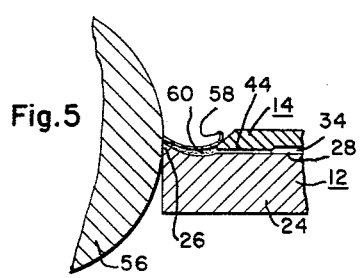
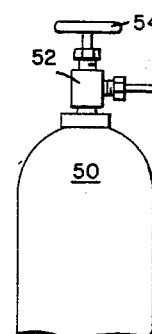
INVENTOR.
George E. McMann.
BY
James N. Ely
ATTORNEY 2,848,790
Patented Aug. 26, 1958

2,848,790

COOLANT DIRECTING CUTTING TOOL ASSEMBLY

George E. McMann, Watervliet, N. Y., assignor to Allegheny Ludlum Steel Corporation, Brackenridge, Pa., a corporation of Pennsylvania Application November 12, 1953, Serial No. 391,618

1 Claim. (Cl. 29—106)

This invention relates generally to the machining of metals, and in particular to cutting tool assemblies for use in the machining of metals.

Heretofore many different means have been employed for delivering a fluid coolant to metal being machined, as for example, by the use of lathes, planers and other machining devices. In general, a fluid coolant and/or lubricant is usually delivered from an external source to flow directly onto the metal being machined adjacent the point of cutting the metal. While the known devices have functioned to prolong the life of the cutting tool to some extent over the life obtained in the absence of a fluid coolant, it has been desired to further increase the life of the cutting tool, and where the metal being machined is readily oxidized, such as titanium and its alloys, it has been desired to prevent the oxidation of the chips machined from such metal.

An object of this invention is to provide a cutting tool assembly having means for internally cooling the assembly and for directing the flow of fluid coolant directly onto the cutting tip beneath the chip being machined from the metal.

Another object of this invention is to provide a cutting tool assembly formed of a cutting tool and a chip breaker and having a passageway common for a major part thereof to both the tool and breaker and being disposed when fluid coolant flows therethrough to effectively cool the assembly and to direct the flow of fluid coolant directly onto the cutting tip of the tool beneath the chip of metal being machined and as the chip moves from the cutting tip to the breaker.

A further object of this invention is to provide, in the process of machining metal with a cutting tool assembly having a chip breaker as a part thereof, for passing fluid coolant between the breaker and the cutting tool to effectively cool the assembly and to direct the flow of the fluid coolant to impinge on the cutting tip of the tool beneath the chip cut by the tip as the chip moves from the tip to the breaker.

Other objects of this invention will become apparent from the following description when taken in conjunction with the accompanying drawing in which:

Figure 1 is a view in side elevation of a chip breaker forming a part of a cutting tool assembly which embodies features of this invention;

Fig. 2 is a bottom plan view of the breaker of Fig. 1;

Fig. 3 is an end view of the breaker of Fig. 1;

Fig. 4 is a view in perspective of a cutting tool assembly embodying features of this invention;

Fig. 5 is a fragmentary view in section of a portion of the cutting tool assembly of Fig. 4 as it is employed in a machining operation and illustrating the directional flow of the fluid coolant;

Fig. 6 is a bottom plan view of a breaker illustrating another embodiment of this invention; and Fig. 7 is an end view of the breaker of Fig. 6.

Referring to the drawing, and in particular to Fig. 4 thereof, a cutting tool assembly embodying the features of this invention is illustrated generally at 10. The cutting tool assembly 10 is formed of a cutting tool 12 and elongated chip breaker 14 and a tool holder 16 assembled in cooperative relation and held in such assembled relation as by means of a suitable yoke 18 provided with a screw member 20 disposed to be threaded through the yoke 18 to engage an elongated slot 22 in the chip breaker 14.

The cutting tool 12 is of the usual type having a shank 24 of elongated form disposed to be held in the holder 16 and a cutting tip 26 which may be either machined in the cutting tool or may be of the well-known carbide tip type. In practice, the surfaces of the shank 24 are preferably machined flat so as to provide a good fit in the holder 16 and for receiving the chip breaker 14.

Referring to Figs. 1, 2 and 3, the chip breaker 14 is more clearly illustrated having an under surface 28 which is machined flat for seating on the upper machined surface of the shank 24 of the cutting tool 12 and on the upper edge of the tool holder 16. As illustrated, the chip breaker 14 is provided with forward inclined edges 30 and 32 for cooperating with the cutting tool 12 to effectively break a metal chip as the metal is machined from a body of metal by the cutting tip 26 of the cutting tool 12. The shape and formation of the forward end of the chip breaker, as well as the shape and angle, etc. of the cutting tip of the cutting tool 12, may be of any desired form and this invention is not limited to the particular form illustrated.

In accordance with this invention, the breaker 14 is provided with an open groove 34 in its lower surface 28, the groove 34 extending lengthwise over the major portion of the surface 28 of the breaker 14. One end of the open groove 34 terminates in a drilled recess 36 which is in communication with a drilled passageway 38 which extends to the rear end of the breaker 14 and terminates in a threaded opening 40 disposed to receive a nipple 42 therein. The other end of the open groove 34 in the forward direction terminates in a smaller open groove 44, preferably of hypodermic needle size, which extends to and terminates in a needle sized orifice in the forward end face 30 of the breaker 14, the smaller groove 44 being disposed at a predetermined angular direction across the face 28 of the breaker 14 to constitute an extension of the open groove 34. In the embodiment illustrated, both of the grooves 34 and 44 extend in the same angular direction. However, the groove 34 may be disposed otherwise, as for example, parallel to the sides of the breaker, but in all cases the groove 44 is of some predetermined angle, the purpose of which will be explained more fully hereinafter.

When the breaker 14 is mounted in assembled relation with its machined surface 28 seated in a tight fit against the machined upper surface of the shank 24 and the breaker 14 is maintained in its assembled relation with the cutting tool 12 and tool holder 16 as by means of the yoke 18 and the screw 20, the open grooves 34 and 44 become closed by reason of the tight fit between the cooperating flat machined surfaces of the breaker 14 and the cutting tool 12. In this position it is evident that the passageway formed by the hypodermic needle sized groove 44 is disposed in an angular direction in the tool assembly to direct fluid coolant flowing therethrough in an angular direction from the end of the breaker 14 to impinge on the cutting tip 26 of the cutting tool 12. Any of the known types of fluid coolants may be employed in conjunction with the cutting tool assembly 10, it being found that water, oil, liquid $CO_2$ or other well-known types of coolants are satisfactory. For supplying the fluid coolant to the cutting tip 26, the nipple 42 may be connected as by means of a suitable conduit 48 to a suitable source of supply of fluid coolant. In the embodiment illustrated in Fig. 4, the conduit 48 is connected to a cylinder 50 of the fluid coolant, such as, for example, a supply of solid $CO_2$ which is readily converted to a liquid at room temperature to develop a pressure exceeding 250 p. s. i. The cylinder 50 is provided with a valve 52 which can be adjusted as by means of a valve wheel 54 for controlling the pressure of the fluid coolant flowing through the conduit 48 and the passageway disposed lengthwise in the cutting tool assembly 10 as described hereinbefore.

With the cutting tool assembly 10 formed in the manner hereinbefore described and connected to a supply of fluid coolant, it is found that when the cutting tip 26 engages metal 56 to be machined, as illustrated in Fig. 5, the chip 58 of metal machined from the work piece 56 is bent and curled as by means of the braker 14 and the fluid coolant flowing through the hypodermic needle orifice of the angularly positioned groove 44 is directed as shown at 60 beneath the chip 58 to impinge directly upon the cutting tip 26. Where the fluid coolant is liquid $CO_2$, the liquid vaporizes upon leaving the needle orifice of the groove 44 to form a vapor which, while impinging directly upon the cutting tip 26, also completely engulfs the chip 58 being machined from the metal 56. The fluid coolant flowing through the passageway formed by the passageway 38 and grooves 34 and 44 in the cutting tool assembly 10 effectively cools the shank of the cutting tool 12 as well as the cutting tip 26 and so engulfs the chip 58 as to cool the chip 58 and prevent oxidation thereof and facilitate the breaking of the chip. Further, since the needle orifice of the groove 44 is beneath the chip 58, it is found that there is no chip interference in the supplying of the fluid coolant directly onto the cutting tip 26 of the tool.

Where the fluid coolant is in the form of a liquid, such as water or a soluble oil or any of the known lubricant types, it is preferred to employ a slightly different shaped open groove 44 in the chip breaker 14. Thus, as illustrated in Figs. 6 and 7, the open groove 44' is in the form of a slit having a width across the face of the chip breaker considerably larger than the height of the groove. For example, the slit forming the orifice of the groove 44' when the chip breaker 14 is assembled on the cutting tool 12 may be up to ⅜ inch wide by .030 inch high. With such an orifice, the liquid coolant flowing through the grooves 34 and 44' emerges in a needle thin layer of spray having a width at least equal to the width of the orifice and sufficient to spray onto the cutting tip 26 over the entire width of the chip or cut removed during the machining operation.

Where the cutting tool assembly 10, described hereinbefore, is utilized to machine metal such as titanium and its alloys, it is found that the life of the cutting tool forming a part of the assembly is greatly prolonged, that the machining time is decreased and substantial savings are effected. As an example of the longer life of the cutting tool resulting from the use of the assembly 10 described hereinbefore and the flow of the fluid coolant through the assembly to impinge directly upon the cutting tip beneath the chip being machined, reference may be had to tests which have been conducted on titanium metal ingots 16 inches in diameter and 35 inches long having a hardness of between 285 and 302 BHM. In all tests to be now referred to, identical cutting tools were employed, a constant rate of feed of .080 IPR was used, together with a depth of cut averaging between ⅜ inch to ⁷⁄₁₆ inch. In three tests using speeds of 3.25 R. P. M., 3.82 R. P. M. and 4.5 R. P. M. without a coolant, identical tools had a life of only 12.49 minutes, 2.26 minutes and 0.88 minute, respectively. On the other hand, using identical tools and with all other conditions identical except that $CO_2$ was used as the fluid coolant in conjunction with the breaker 14 of Figs. 1 and 2 in the assembly 10, a tool life of 65.25 minutes, 16.38 minutes and 2.97 minutes, respectively, was obtained giving in effect an increase in tool life of from about 250 percent to over 600 percent over the life of the tools employed without a coolant.

Corresponding increases in life have been found in machining forged round billets of other titanium metals. For example, in a test conducted on a 7¾ inch diameter forged round at .080 IPR feed and ¼ inch average depth of cut and a speed of 9.2 R. P. M.'s, where the machining was done without a coolant, a tool life of 3.60 minutes was obtained. Using an identical tool with the fluid coolant flowing through the cutting tool assembly 10 to impinge upon the tip 26, as illustrated in Figs. 4 and 5, and with the other conditions of the test being identical, it is found that the tool life was increased to 17.97 minutes.

This invention makes it possible to increase both the speed of the turning of the metal being machined as well as the depth of the cut so that substantial savings in machining time can be effected at the same time the idle machine time can be kept at a minimum. In addition, a substantial savings is effected where the metal being machined is readily oxidized, for by impinging the fluid coolant directly on the cutting tip beneath the chip and engulfing the chip in the fluid coolant, the chip is protected against oxidation so that the metal of the chip can be readily reclaimed without expensive processing to deoxidize such chips.

While the specific examples referred to hereinbefore relate to the machining of titanium metal and to the use of $CO_2$ as the fluid coolant, this invention is not to be limited thereto, but is applicable to the machining of other metals and to the use of other fluid coolants such as are well-known to the art. Regardless of the fluid coolant employed, corresponding savings are effected by utilizing the cutting tool assembly described hereinbefore.

I claim:

In a cutting tool assembly for machining metal and directing a fluid coolant thereto, the combination comprising, a cutting tool having a shank and a cutting tip, an elongated chip breaker disposed to seat lengthwise of the shank of the cutting tool, the cutting tool and chip breaker having their seating surfaces machined flat, an open groove in the machined surface of the chip breaker disposed lengthwise thereof, one end of the open groove terminating in a fluid coolant passageway extending to the rear of the breaker, the other end of the open groove terminating at the chip breaking end of the breaker and being spaced from the cutting tip when the breaker is seated on the cutting tool disposed to direct fluid coolant to flow beneath the chip as the chip passes from the cutting tip to the breaker and to impinge the fluid coolant directly on the cutting tip of the cutting tool beneath the chip machined from the metal.

References Cited in the file of this patent

UNITED STATES PATENTS

| | | |
|---|---|---|
| 160,161 | Clay | Feb. 23, 1875 |
| 178,170 | Lingard | May 30, 1876 |
| 522,588 | Chouteau | July 10, 1894 |
| 1,854,672 | Robinson et al. | Apr. 19, 1932 |
| 2,550,645 | Retz | Apr. 24, 1951 |
| 2,641,047 | Jackman | June 9, 1953 |
| 2,653,517 | Pigott | Sept. 29, 1953 |
| 2,683,303 | Pigott | July 13, 1954 |
| 2,713,282 | Burgsmuller | July 19, 1955 |